United States Patent
Kaneko et al.

(10) Patent No.: US 8,199,765 B2
(45) Date of Patent: Jun. 12, 2012

(54) INTERFERENCE-DETECTING WIRELESS COMMUNICATION METHOD AND APPARATUS

(75) Inventors: Yutaka Kaneko, Kanagawa (JP); Masaharu Hamaguchi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 268 days.

(21) Appl. No.: 12/656,266

(22) Filed: Jan. 22, 2010

(65) Prior Publication Data
US 2010/0246556 A1    Sep. 30, 2010

(30) Foreign Application Priority Data
Mar. 30, 2009    (JP) .................................. 2009-082735

(51) Int. Cl.
*H04L 12/56* (2006.01)
*H04J 1/16* (2006.01)
(52) U.S. Cl. .................... 370/419; 370/252; 370/430
(58) Field of Classification Search .................. 370/252, 370/430, 419
See application file for complete search history.

(56) References Cited

U.S. PATENT DOCUMENTS

| | | | |
|---|---|---|---|
| 6,418,558 B1 * | 7/2002 | Roberts et al. | 725/129 |
| 7,570,712 B2 * | 8/2009 | Welborn et al. | 375/307 |

FOREIGN PATENT DOCUMENTS

JP    2001-237847 A    8/2001

* cited by examiner

*Primary Examiner* — John Pezzlo
(74) *Attorney, Agent, or Firm* — Rabin & Berdo, P.C.

(57) ABSTRACT

In a wireless communication system, the communicating stations reduce their transmitting power level when they detect interference exceeding a certain level. Interference is detected by down-shifting the received signal to place the desired signal in the baseband, then sampling the down-shifted signal, first at a sampling frequency high enough to catch the interference, then at a lower sampling frequency that excludes the interference. This system is useful for vehicle-to-vehicle communication in an environment in which vehicle-to-roadside communication may also be present at various nearby frequencies, because it does not require exact knowledge of the interfering frequencies and allows communication to continue even when interference is present.

19 Claims, 6 Drawing Sheets

FIG.5

| SIR LEVEL [dB] | Tx LEVEL [mW] |
|---|---|
| $X_n$ | $P_s - N_n$ |
| ... | ... |
| $X_k$ | $P_s - N_k$ |
| ... | ... |
| $X_2$ | $P_s - N_2$ |
| $X_1$ | $P_s - N_1$ |
| $Y_0$ | $P_s$ mW |
| $Y_1$ | $P_s$ mW |
| $Y_2$ | $P_s$ mW |
| ... | ... |
| $Y_m$ | $P_s$ mW |

← SIRTH (between $X_1$ and $Y_0$ rows)

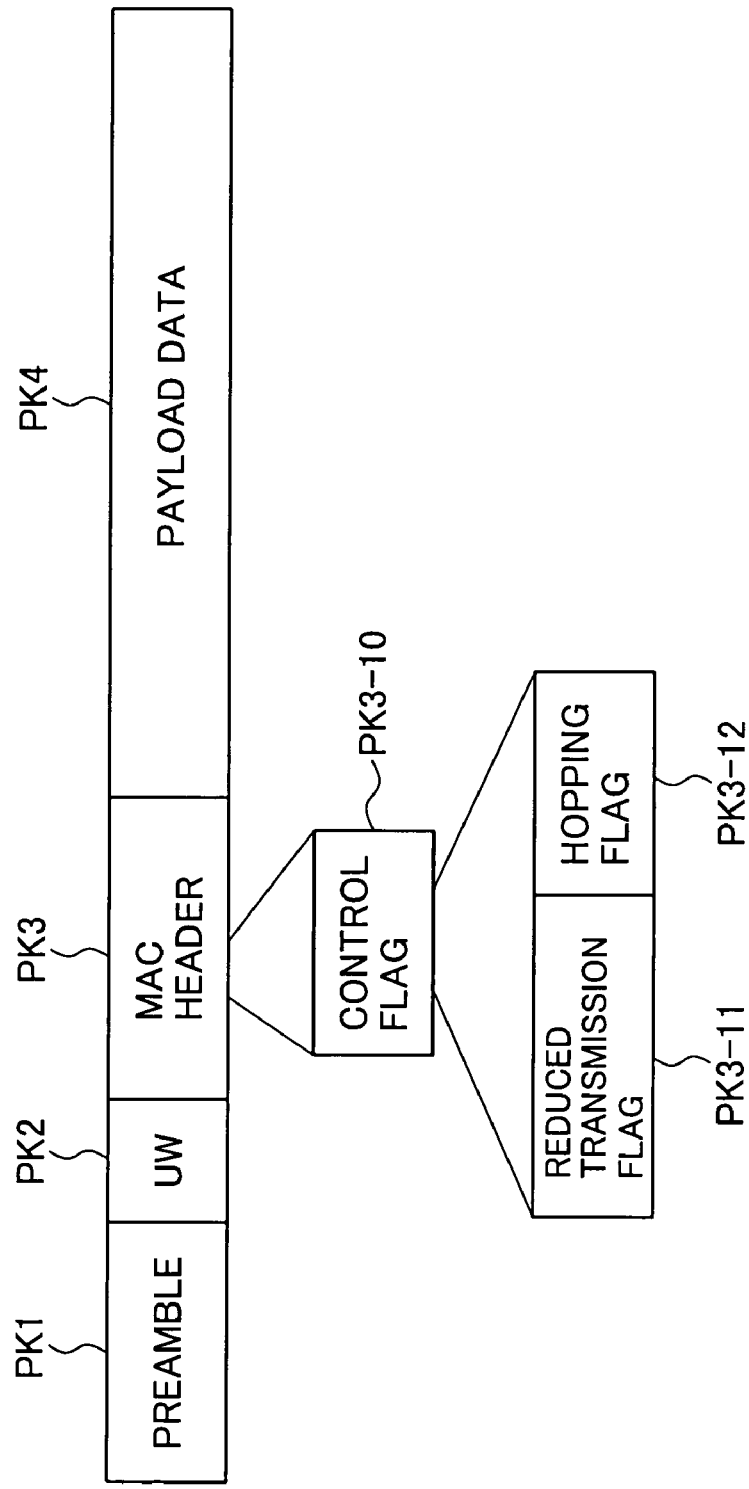

INTERFERENCE-DETECTING WIRELESS COMMUNICATION METHOD AND APPARATUS

BACKGROUND OF THE INVENTION

1. Field of the Invention

The present invention relates generally to wireless communication, and in particular to vehicle-to-vehicle wireless communication in a frequency band shared with other types of wireless communication.

2. Description of the Related Art

Vehicle-to-vehicle communication is an emerging technology with numerous applications under study, including collision warning systems. Many of the systems being developed use a frequency band allocated for use under the Dedicated Short Range Communications (DSRC) standards. The same frequency band is also used for vehicle-to-roadside communications, including electronic toll collection.

In a vehicle-to-roadside DSRC system, the allocated frequency band is divided into a plurality of frequency channels. Interference between communications in mutually adjacent or overlapping wireless service areas is avoided by the assignment of different channels to different areas. Packet collisions in communications on the same channel by multiple vehicles in a single wireless service area are avoided by a time division multiple access (TDMA) system. The roadside base station in each service area designates the channels used and controls the vehicles' transmission timings. The mobile stations in the vehicles carry out a frequency selection process and a transition process specified in the DSRC standards, which enables them to communicate with the base station in each communication area on the designated channels.

Vehicle-to-vehicle communication systems avoid packet collisions by using a carrier sense multiple access (CSMA) transmission control system in which, before transmitting on a desired carrier frequency, a mobile station detects the desired carrier signal, observes the signals transmitted by other mobile stations on this carrier frequency, waits for their transmissions to cease, and then transmits its own signal.

Since vehicle-to-vehicle communication systems and vehicle-to-roadside communication systems use the same frequency band, when a vehicle communicating with another vehicle enters a vehicle-to-roadside communication service area, interference may occur. Disruption of vehicle-to-roadside communication by interference from vehicle-to-vehicle communication is particularly troublesome, because by the time the interference ends, the vehicle that is trying to communicate with the roadside base station may have left the base station's wireless service area.

In Japanese Patent Application Publication No. 2001-237847, Mizoguchi et al. describe a method of avoiding interference between a wireless communication system and, for example, a weather radar system using the same frequency band. A station in the wireless communication system receives both the radar signal and the desired communication signal, detects the levels of both signals, and refrains from transmitting communication packets for a predetermined time if either signal level exceeds a predetermined level. Besides preventing packet collisions, this scheme also prevents transmitted packets from interfering with the radar signal.

If this method were to be applied to vehicle-to-vehicle communications, however, then communication would be interrupted whenever interference from another system exceeded a predetermined level. Such interruptions could have serious consequences when the information to be transmitted by vehicle-to-vehicle communication is an emergency signal or warning signal.

Another problem in the system described by Mizoguchi et al. is the need for extra circuitry to identify or isolate the interfering signal so that its level can be measured.

Yet another problem is that the frequency of the interfering signals encountered in vehicle-to-vehicle communication systems may vary as the vehicles travel down the road, making it necessary to search for the interfering frequency by scanning the available channels, a time-consuming process.

SUMMARY OF THE INVENTION

An object of the present invention is to provide a wireless communication method and apparatus that can react quickly to avoid interference without interrupting communication and without requiring extensive interference detection circuitry.

The invention provides a method of communicating among a plurality of stations in a wireless environment in which a first signal with a first center frequency is present in a first frequency band. The plurality of stations communicate in a second frequency band with a second center frequency separated from the first center frequency by a certain separation frequency.

In transmission, transmit data and a control signal are assembled into a transmit packet signal, which is modulated onto a carrier signal at the second center frequency and transmitted at a controlled transmitting power level.

In reception, an incoming signal including the first signal and a second signal having the second center frequency is down-converted to obtain a third signal. The down-conversion process converts the second signal to the baseband. The third signal is sampled and thereby converted to a discrete received signal, and the interference level of the first signal is detected from the discrete received signal.

The transmitting power level may be determined from the interference level. In particular, the transmitting power level may be reduced when the detected level of the first signal exceeds a predetermined threshold level.

The sampling frequency may be determined from the separation frequency, if known, or from the minimum or maximum separation frequency in a permitted range of separation frequencies. The sampling frequency may be sequentially increased or decreased to search for a plurality of possible first signals.

The control signal may include a reduced transmission flag, which is set when the transmitting power level is reduced, indicating that the transmitted packet signal is to be forwarded by the receiving station, and a hopping flag, indicating that the transmitted packet signal is a forwarded signal. The hopping flag is set when the reduced transmission flag is detected in the discrete received signal.

By lowering the transmitting power when interference from the first signal in the received signal exceeds a certain level, it is possible to reduce interference from the second signal into the first signal.

By setting the reduced transmission flag, it is possible to maintain communication even at the reduced power level, by having packets relayed over multiple hops. Communication is accordingly not interrupted when interference is present.

The interference level can be detected by digitally resampling the discrete received signal at a sampling frequency low enough to eliminate the first signal and comparing the levels of the discrete received signal before and after resampling.

This level detection method does not require extensive circuitry, and the size and cost of the communication apparatus can be reduced accordingly.

This level detection method also does not require precise identification or isolation of the first signal. The level of interference caused by the first signal can therefore be detected quickly, even if the first center frequency is not precisely known.

BRIEF DESCRIPTION OF THE DRAWINGS

In the attached drawings:

FIG. 5 is a table of signal-to-interference power ratios and transmission levels used by the communication controller in the embodiment; and FIG. 6 is a diagram showing a packet frame structure used in the embodiment.

DETAILED DESCRIPTION OF THE INVENTION

Figure 1:
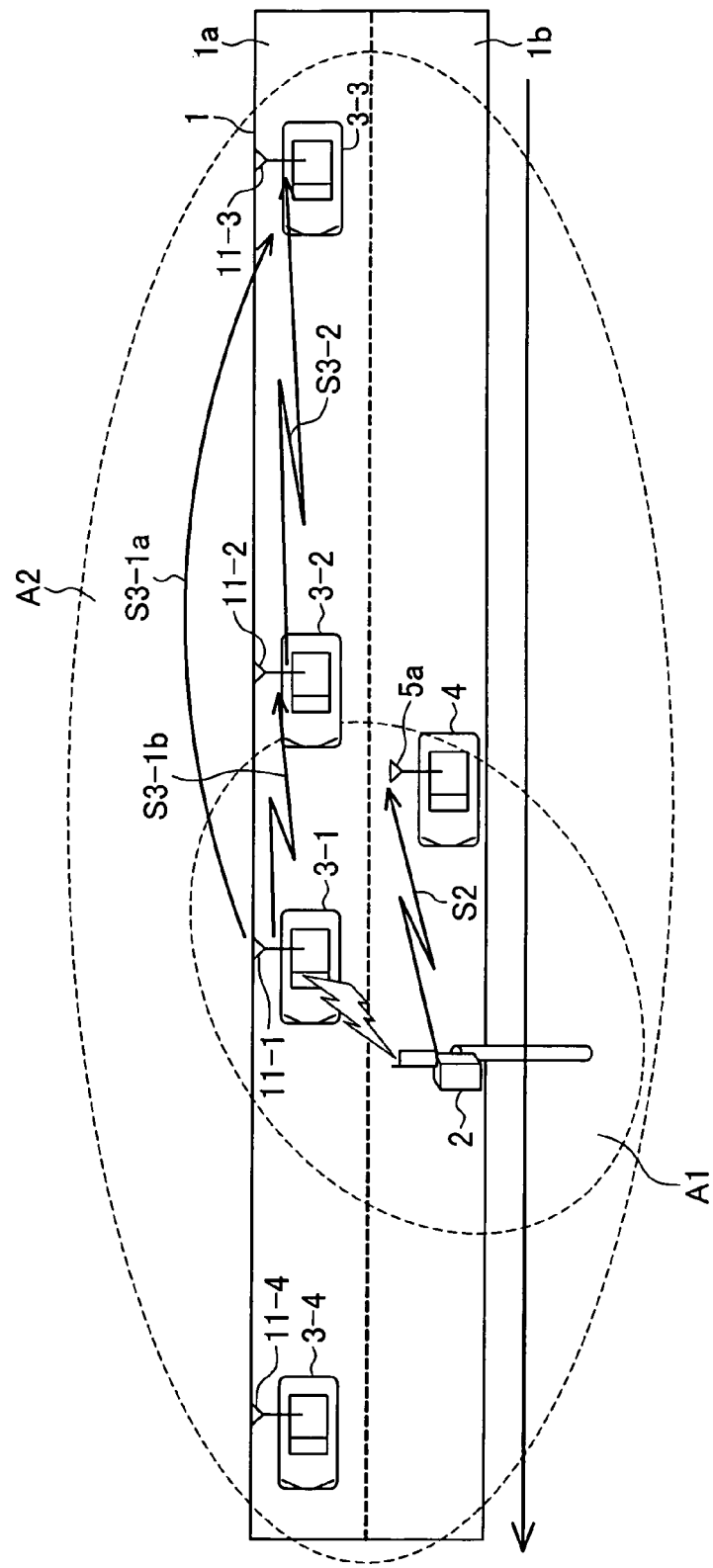
FIG. 1 illustrates a vehicle-to-vehicle communication system using a vehicle-to-vehicle communication apparatus and method embodying the invention.

A vehicle-to-vehicle communication system embodying the invention will now be described with reference to the attached drawings, in which like elements are indicated by like reference characters.

FIG. 1 illustrates a vehicle-to-vehicle communication system operating on a road 1 having two lanes 1a, 1b. A base station 2 is installed on the shoulder of the road 1 adjacent lane 1b. A plurality of vehicles 3 (individually designated 3-1 to 3-4) are proceeding to the left in the drawing in lane 1a. The vehicles 3 have respective vehicle-to-vehicle communication apparatuses with respective antennas 11 (designated 11-1 to 11-4). A vehicle 4 with an antenna 5a is proceeding in the same direction, as indicated by the arrow, in lane 1b.

The base station 2 is used in a communication system that provides a service such as electronic toll collection (ETC). Vehicle 4 has just entered a vehicle-to-roadside communication area A1 centered on the base station 2. The base station 2 uses a first frequency band with a carrier frequency f1 to transmit a first signal S2 to vehicle 4. This first signal will also be referred to as an interfering signal (IS) since it interferes with communication between the vehicles 3 in lane 1a.

The communication apparatuses in these vehicles 3 use a second frequency band with a carrier frequency f2, on which they communicate with each other by transmitting a second signal such as an emergency signal (ES). Carrier frequency f2 is comparatively close to carrier frequency f1. The difference between the two carrier frequencies f1, f2 is the separation frequency $\Delta f(\Delta f=|f1-f2|)$.

In area A2, vehicle 3-1 is communicating with vehicle 3-3 by transmitting a signal S3-1a to vehicle 3-3. When vehicle 3-1 enters area A1 and senses interference from the base station 2, however, it reduces its transmitting power and tries to continue communication with vehicle 3-3 by transmitting a signal S3-1b to vehicle 3-2, which is cruising between vehicles 3-1 and 3-3. Vehicle 3-2 receives signal S3-1b and forwards it to vehicle 3-3 as signal S3-2.

Figure 2:
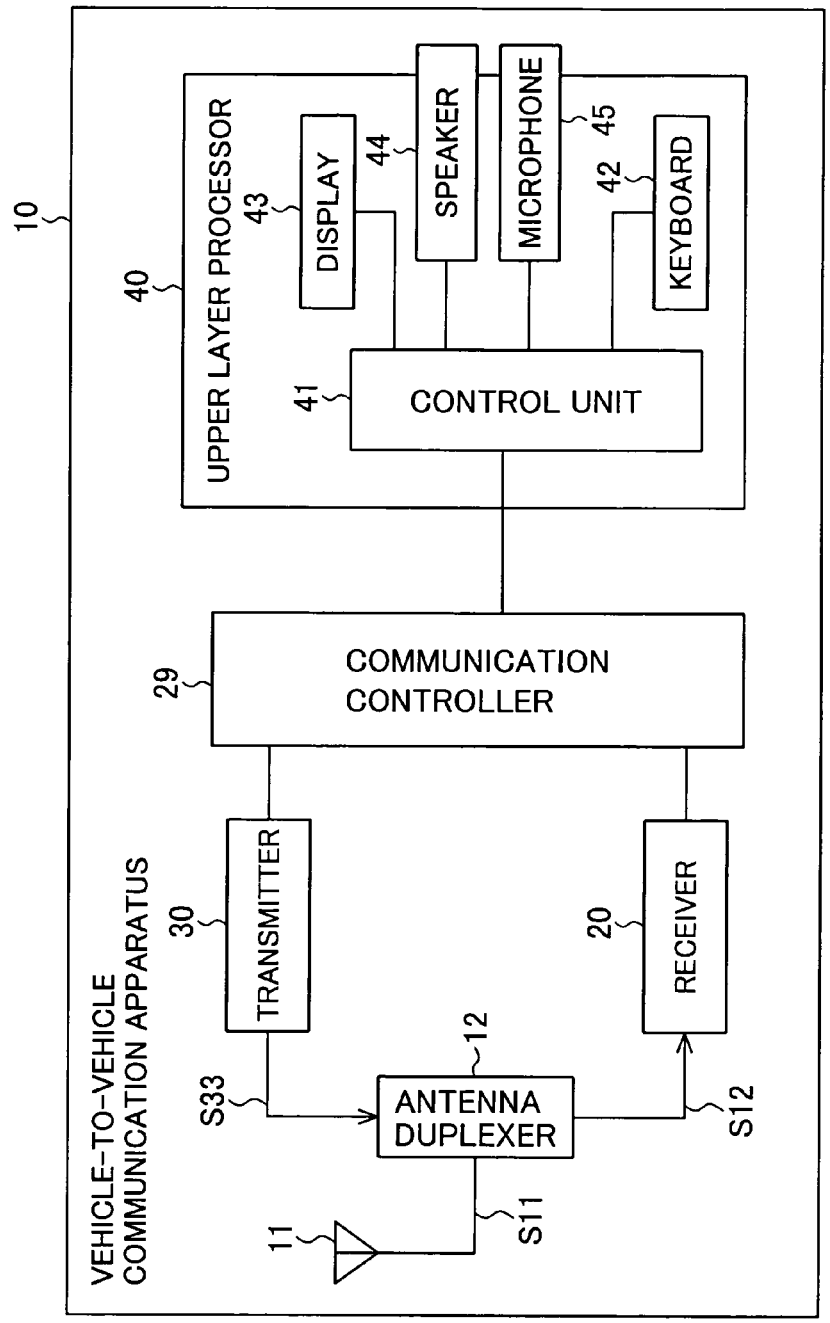
FIG. 2 is a block diagram of the vehicle-to-vehicle communication apparatus in this embodiment.

Referring to FIG. 2, the vehicle-to-vehicle communication apparatus 10 in each vehicle in this embodiment includes an antenna 11, an antenna duplexer 12, a receiver 20, a communication controller 29, a transmitter 30, and an upper layer processor 40. The upper layer processor 40 includes a control unit 41, a keyboard 42, a display 43, a speaker 44, and a microphone 45. The control unit 41 is connected to the communication controller 29, and controls the keyboard 42, display 43, speaker 44, and microphone 45.

The communication controller 29 is connected to the receiver 20 for input and to the transmitter 30 for output, and controls transmission and reception. The transmitter 30 receives transmit data from the communication controller 29 and outputs a modulated transmit signal S33 to the antenna duplexer 12. During transmission, the antenna duplexer 12 connects the antenna 11 to the transmitter 30 and sends the transmit signal S33 to the antenna 11.

The antenna 11 is also used for reception. During reception, the antenna duplexer 12 connects the antenna 11 to the receiver 20 and sends the signal S12 received by the antenna 11 to the receiver 20. The receiver 20 demodulates the received signal S12 and outputs demodulated packet data to the communication controller 29.

Figure 3:
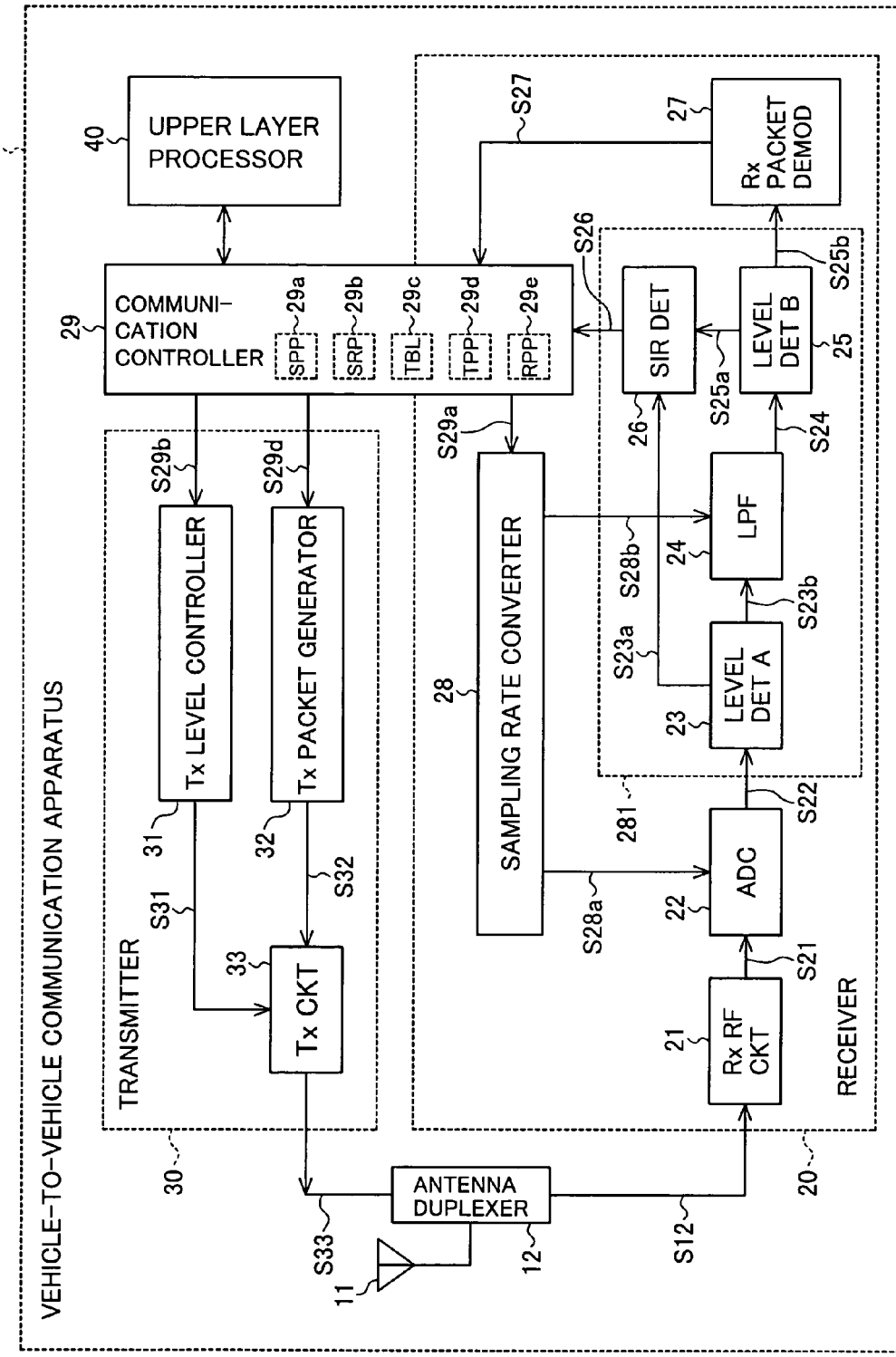
FIG. 3 is a more detailed block diagram of the vehicle-to-vehicle communication apparatus in the embodiment.

Referring to FIG. 3, the receiver 20 includes a radio frequency receiving circuit (Rx RF CKT) 21, an analog to digital converter (ADC) 22, a level detection circuit (DET) A 23, a digital low pass filter (LPF) 24, a level detection circuit B 25, a signal to interference ratio (SIR) detector (DET) 26, a received (Rx) packet demodulator (DEMOD) 27, and a sampling rate converter 28. The transmitter 30 includes a transmit (Tx) level controller 31, a transmit (Tx) packet generator 32, and a transmitting circuit (Tx CKT) 33. The level detection circuit A 23, low pass filter 24, level detection circuit B 25, and SIR detector 26 in the receiver 20 constitute an interference level detector 281.

During reception, the antenna duplexer 12 connects the antenna 11 to the receiver 20 and outputs the received signal S12 as described above. The radio frequency receiving circuit 21 down-converts the received signal S12 (reduces its frequency) to obtain a baseband signal S21, which is supplied to the analog to digital converter 22.

The analog to digital converter 22 samples the baseband signal S21 with a sampling frequency fs1 given by a sampling signal S28a and outputs a resulting discrete received signal S22 to the interference level detector 281.

Figure 4A:
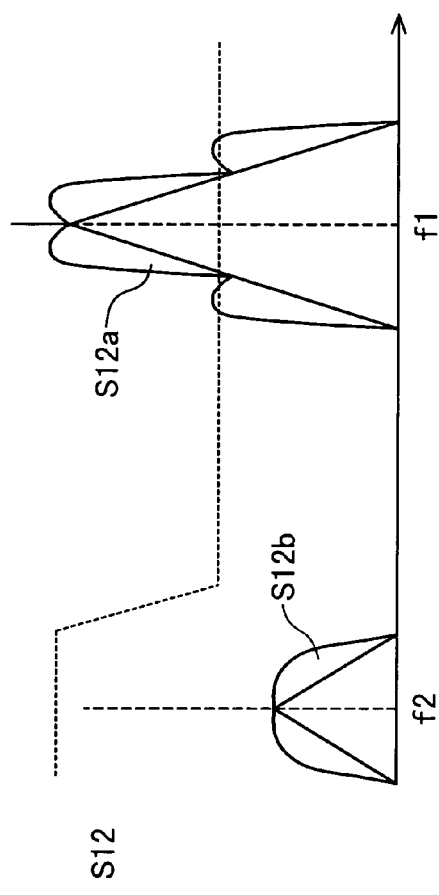
FIGS. 4A and 4B illustrate received signal frequency spectra before and after down-shifting, and indicate attenuation characteristics and sampling frequencies used in the embodiment.
Figure 4B:
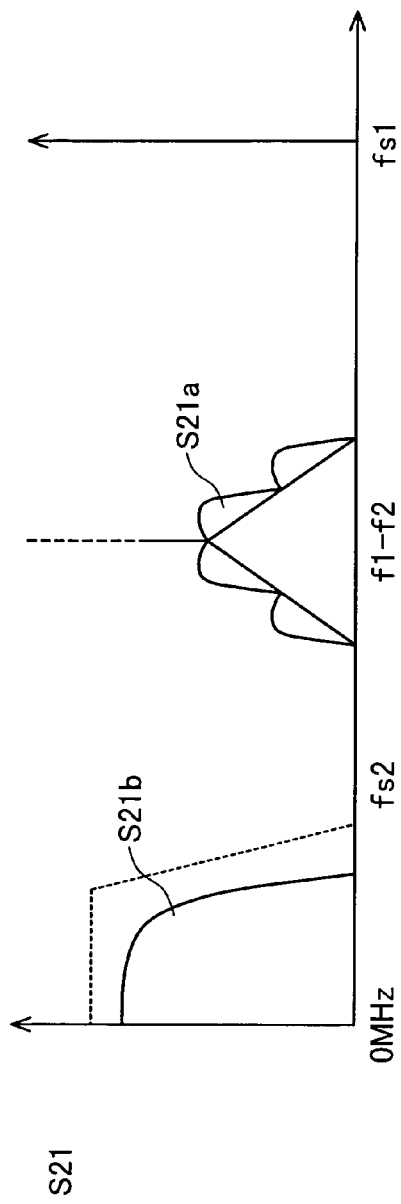

Referring to the frequency spectrum in FIG. 4A, the received signal S12 includes an interference signal S12a with carrier frequency f1 and a desired signal S12b with carrier frequency f2. The radio frequency receiving circuit 21 attenuates the signal intensity of the interference signal S12a by, for example, half and down-converts both signals S12a, S12b so that the desired signal Sl2b is placed at the bottom end of the baseband. As shown in FIG. 4B, the baseband signal S21 includes both the down-converted interference signal S21a and the down-converted desired signal S21b. The frequency spectrum of the down-converted interference signal S21a is centered on the separation frequency $\Delta f$.

Normally, a sampling frequency fs2 would be used to sample the desired signal S21b, but the analog-to-digital converter 22 uses a higher sampling frequency fs1 determined on the basis of the separation frequency $\Delta f$ so that the down-converted interference signal S21a, as well as the desired signal S21b, can be detected in the discrete received signal S22.

Referring again to FIG. 3, level detection circuit A 23 in the interference level detector 281 measures the level of the discrete received signal S22 as a first received power level (level A), outputs a resulting level-A signal 23a to the SIR detector 26, and passes the discrete received signal S22 as an output discrete received signal S23b to the low pass filter 24. The low pass filter 24 resamples this discrete received signal S23b according to a resampling signal S28b, thereby removing the interference signal IS (signal S21a in FIG. 4) and extracting the desired signal ES (signal S21b in FIG. 4), which it outputs as an LPF signal S24 to level detection circuit B 25.

Level detection circuit B 25 measures a second received power level (level B) of the LPF signal S24, outputs a resulting level-B signal S25a to the SIR detector 26, and passes the LPF signal S24 as an output LPF signal S25b to the received packet demodulator 27. From the level-A signal 23a and level-B signal S25a, the SIR detector 26 obtains the signal level S of the desired signal ES and the signal level I of the interference signal IS, calculates the signal-to-interference ratio level or SIR level, and outputs an SIR level signal S26 to the communication controller 29.

The received packet demodulator 27 demodulates the LPF signal S24 passed to it as the LPF signal S25b and outputs a received packet signal S27 to the communication controller 29.

The sampling rate converter 28 receives a bandwidth signal S29a from the communication controller 29 and outputs the sampling signal S28a to the analog to digital converter 22 and the resampling signal S28b to the low pass filter 24.

The communication controller 29 comprises a central processing unit (CPU, not shown) and a storage unit (not shown) in which programs for executing various processes are stored. In combination, the CPU, the storage unit, and the stored programs constitute a set of facilities including at least a sampling processor (SPP) 29a, an SIR processor (SRP) 29b, a table (TBL) 29c, a transmit packet processor (TPP) 29d, and a received packet processor (RPP) 29e.

The sampling processor 29a outputs the bandwidth signal S29a, from which the sampling rate converter 28 derives the sampling signal S28a and resampling signal S28b.

The SIR processor 29b outputs a transmit level signal S29b to the transmit level controller 31, based on the SIR level signal S26. The SIR processor 29b obtains the transmit level signal S29b from the SIR level signal S26 and the table 29c, which stores data describing a relationship between SIR levels and transmitting power levels.

The table 29c is structured as shown in FIG. 5, with a set of SIR levels and the corresponding transmitting power levels (Tx levels). An interference threshold level SIRTH is preset for the SIR levels. SIR levels $Y_0, Y_1, Y_2, \ldots, Y_m$ lower than the interference threshold level SIRTH all correspond to a normal transmitting power level Ps. SIR levels $X_1, X_2, \ldots, X_k, \ldots, X_n$ successively higher than the interference threshold level SIRTH correspond to transmitting power levels lower than Ps by successively larger amounts $N_1, N_2, \ldots, N_k, \ldots, N_n$ (k, m, and n are integers).

The transmit packet processor 29d outputs the transmit data S29d from which the transmit packet generator 32 in FIG. 3 generates a transmit packet signal. The received packet processor 29e generates received data from the received packet signal S27 and outputs the received data to the transmit packet processor 29d and the upper layer processor 40.

The transmit level controller 31 receives the transmit level signal S29b and outputs a transmit level control signal S31 to the transmitting circuit 33 to control the transmitting level.

The transmit packet generator 32 receives the transmit data S29d, which includes a control flag for controlling packet transmission as described below, and generates a transmit packet signal S32, which is output to the transmitting circuit 33.

Referring to FIG. 6, the frame structure of the transmit packet signal S32 comprises, from the first field to the last field, a preamble PK1, a unique word (UW) PK2, a MAC header PK3, and payload data PK4. The MAC header PK3 includes a control signal or control flag PK3-10, which is actually a pair of flags, including a reduced transmission flag PK3-11 and a hopping flag PK3-12.

The transmitting circuit 33 modulates the transmit packet signal S32 onto a carrier wave with frequency f2, amplifies the resulting modulated transmit packet signal S32 up to the transmitting power level specified by the transmit level control signal S31, and outputs the amplified transmit signal S33 to the antenna duplexer 12.

The general vehicle-to-vehicle communication method and the specific operation of the method during reduced level transmission will now be described.

First, the general vehicle-to-vehicle communication method will be described.

The vehicle-to-vehicle communication apparatus 10 in FIG. 3 receives a communication signal from the antenna 11. The received signal S12 is input to the radio frequency receiving circuit 21.

As shown in FIG. 4A, the received signal S12 includes an interference signal S12a with a carrier frequency f1 and a desired signal S12b with a carrier frequency f2. The radio frequency receiving circuit 21 operates with a filter-like attenuation characteristic, indicated by the dotted line in FIG. 4A, that somewhat attenuates the interference signal S12a. The radio frequency receiving circuit 21 down-converts the received signal S12 in such a way that the desired signal S12b is converted to the baseband proper (the bottom part of the baseband, including the zero frequency) and outputs a baseband signal S21 including both the down-shifted desired signal S21b and the down-shifted interference signal S21a. As shown in FIG. 4B, the down-shifted interference signal S21a has a center frequency of |f1−f2|.

The analog to digital converter 22 samples the baseband signal S21 at a sampling frequency fs1 equal to the frequency of the sampling signal S28a and outputs the discrete received signal S22. The sampling frequency fs1 satisfies the following condition (1).

$$fs1 \geq n \times |f1-f2| \text{ where, } n \geq 2 \tag{1}$$

In the above equation, the term |f1−f2| corresponds to the separation frequency $\Delta f$, and the factor n is the number of channels present in the interval from the desired signal ES to the interference signal IS, inclusive. When the desired signal ES and the interference signal IS use adjacent channels, for example, the factor n is equal to two (n=2). When the interference carrier frequency f1 is unknown, a separation frequency $\Delta f$ equal to the maximum separation allowed by the relevant DSRC system specification is preferably assumed, so that all possible interference can be detected. Alternatively, to detect adjacent-channel interference as quickly as possible, the assumed separation frequency $\Delta f$ may be set equal to the minimum possible separation between the desired signal ES and the channel used by the base station 2, e.g., to the channel spacing value in the relevant DSRC system specification.

The interference level is detected in the interference level detector 281 as follows. Level detection circuit A 23 measures the total power level of the discrete received signal S22 and outputs it as the level-A signal 23a. The low pass filter 24 resamples the discrete received signal S22 at a sampling frequency equal to the frequency of the resampling signal S28b. This sampling frequency is low enough to remove the interference signal IS; the filter characteristic produced by the resampling process is indicated by the dotted line in FIG. 4B.

The resampling process is carried out by, for example, dividing the discrete received signal S22 into consecutive segments of n samples each and calculating the sum or average of the values in each segment. The output LPF signal S24 includes only the desired signal ES. The level detection circuit B 25 measures the power level of the LPF signal S24 and outputs it as the level-B signal S25a.

The level-A signal 23a indicates the sum (S+I) of the signal level S of the desired signal ES and the signal level I of the interference signal IS. The level-B signal S25a indicates only the signal level S of the desired signal ES. By subtracting level B (S) from level A (S+I), the SIR detector 26 obtains the power level (I) of the interference signal IS. The SIR level signal S26 output by the SIR detector 26 can then be obtained as the ratio of the desired signal level S to the signal level I.

In the description so far a single interference level has been detected, which is adequate for the scenario shown in FIG. 1, but in the general case more than one interference signal may be present. It may then be desirable to detect the power levels of the interference signals individually and determine the transmitting power level from, for example, the level of the strongest interference signal, or some other one of the interference signals. This can be done by increasing the first sampling frequency from, for example, twice the minimum possible separation frequency to twice the maximum possible separation frequency, in steps corresponding to the channel spacing in the relevant DSRC system specification, and comparing the successively detected interference levels. Alternatively, the first sampling frequency may be decreased sequentially from twice the maximum to twice the minimum possible separation frequency, so as first to detect the total interference level and then detect the levels of the interference signals individually, if interference is present.

The received packet demodulator 27 demodulates the LPF signal S24 to obtain the received packet signal S27.

The SIR processor 29b in the communication controller 29 outputs the transmit level signal S29b on the basis of the SIR level signal S26 and the table 29c shown in FIG. 5. If the SIR level is one of the values $Y_0$ to $Y_m$ below the threshold level SIRTH, meaning that negligible interference is detected, the SIR processor 29b sets the transmit level signal S29b to indicate a transmitting level of Ps mW, which is the normal transmitting power. When the SIR level is, for example, $X_1$, just above the interference threshold level SIRTH, the transmit level signal S29b indicates a reduced transmitting level of (Ps−$N_1$) mW. If the SIR level increases to $X_k$, the transmitting level is further reduced to (Ps−$N_k$) mW, where $N_k$ is greater than $N_1$. The transmit level controller 31 outputs the transmit level control signal S31 on the basis of the transmit level signal S29b.

Meanwhile, the transmit packet generator 32 receives transmit data S29d, including the control flag PK3-10, and generates the transmit packet signal S32. The transmitting circuit 33 modulates the transmit packet signal S32 onto a carrier wave to produce the transmit signal S33, the power level of which is controlled according to the transmit level control signal S31. The antenna duplexer 12 connects the antenna 11 to the transmitter 30, and the transmit signal S33 is transmitted as a radio signal.

Next, the operation of the vehicle-to-vehicle communication apparatus 10 during reduced transmission will be described through the example shown in FIG. 1, in which vehicle 3-1 communicates with vehicle 3-3 via vehicle 3-2.

By transmitting at the normal power level Ps, vehicle 3-1 can communicate with any of the vehicles in area A2. Originally, vehicle 3-1 transmits a signal S3-1a directly to vehicle 3-3, using carrier frequency f2, but when it enters area A1, it detects interference from the signal S2 transmitted by the base station 2 on a nearby carrier frequency f1, which is separated from frequency f2 by the separation frequency Δf, to the vehicle 4 traveling in the lane 1b.

More specifically, the SIR detector 26 in the vehicle-to-vehicle communication apparatus 10-1 in vehicle 3-1 detects the interference level and outputs the SIR level signal S26. The SIR processor 29b in the communication controller 29 refers to the table 29c shown in FIG. 5. If the SIR level is $X_k$, for example, the SIR processor 29b outputs a transmit level signal S29b specifying a transmitting level of (Ps−$N_k$).

The transmit packet processor 29d of the communication controller 29 outputs transmit data S29d in which the reduced transmission flag PK3-11 is set. The transmit packet generator 32 packetizes the transmit data S29d and outputs a transmit packet signal S32. The transmitting circuit 33 modulates the transmit packet signal S32 onto the carrier wave, which has frequency f2, and transmits the resulting modulated signal as the signal S3-1b in FIG. 1 from the antenna 11-1 of vehicle 3-1.

Since this signal S3-1b is transmitted at a reduced power level, it cannot be received by vehicle 3-3, but vehicle 3-2 is traveling near vehicle 3-1 and has not yet entered area A1. The distance from vehicle 3-1 to vehicle 3-2 is short enough that vehicle 3-2 can receive signal S3-1b despite the reduced transmitting level.

In the vehicle-to-vehicle communication apparatus 10-2 mounted on vehicle 3-2, the receiver 20 receives signal S3-1b, and the received packet demodulator 27 outputs a received packet signal S27. The sampling processor 29a of the communication controller 29 detects the reduced transmission flag PK3-11 and instructs the transmit packet processor 29d to process and forward the received packet signal S27. From the received packet signal S27, the transmit packet processor 29d creates transmit data S29d in which the hopping flag PK3-12 is set to indicate forwarding, but the reduced transmission flag PK3-11 is not set because vehicle 3-2 has not yet detected interference from the base station 2. From the transmit data S29d, the transmit packet generator 32 creates a transmit packet signal S32. From the transmit packet signal S32, the transmitting circuit 33 creates the signal S3-2 that is transmitted from the antenna 11-2 of vehicle 3-2 to vehicle 3-3 in FIG. 1.

Signal S3-2 is transmitted at the normal power level, so it can be received by vehicle 3-3. A transmission path via vehicle 3-2 is thus formed, on which communication between vehicles 3-1 and 3-3 continues.

One effect of the above embodiment is that only the desired signal ES has to be converted accurately to the baseband. The interference level is detected from the disappearance of interference when the baseband is narrowed by resampling at a lower sampling frequency. It is therefore unnecessary to identify or isolate the interfering signal by, for example, using a phase-locked loop to generate a local frequency matching the interfering signal frequency. As a result, interference levels can be detected quickly by comparatively small and inexpensive circuitry.

A second effect of the above embodiment is that when a first vehicle that is communicating with a second vehicle enters a vehicle-to-roadside communication area, the first vehicle does not have to stop communicating to avoid interfering with vehicle-to-roadside communication; it only has to reduce its transmitting power level. Although this may put the second vehicle out of receiving range of the first vehicle, communication between the first and second vehicles can continue by being relayed through a third vehicle located nearby. Accordingly, the reduced transmitting level does not entail a reduced communication area or an interruption of communication.

One effect of the reduced transmission flag and the hopping flag is that if a vehicle receives a packet with either one of these flags set, it knows that it is near a source of interference and can set the sampling frequency of its receiver to a frequency that permits rapid detection of the interference. In addition, if the reduced transmission flag is set, the receiving vehicle knows that it should forward the received packet to other nearby vehicles.

A fourth effect of the above embodiment is that, by sequentially changing the sampling frequency, it is possible to identify the specific channels on which interference signals are present. It is therefore unnecessary to perform the conventional frequency selection process to search for interference channels.

The invention is not limited to the embodiment described above.

Many other modifications of the overall configuration and the individual blocks shown in FIG. 3 are possible. For example, the analog-to-digital converter 22 in FIG. 3 may be replaced by an analog sample-and-hold circuit, and some or all of the blocks in the interference level detector 281 may also be analog circuits.

The table 29c in FIG. 5 may be structured in various other ways to store the relationship between SIR levels and transmitting power levels, or may be replaced by an arithmetic or logic circuit that calculates the transmitting power level from the SIR level.

The reduced transmission flag and hopping flag may be located at any recognizable positions in the packet frame structure in FIG. 6, not limited to the MAC header PK3.

The source of interference is not limited to a vehicle-to-roadside communication system as shown in FIG. 1. The source of interference may be another type of DSRC system, such as, for example, a parking management system.

The invention is not limited to use in vehicle-to-vehicle communication systems; it is applicable to wireless communication systems in general.

Those skilled in the art will recognize that still further variations are possible within the scope of the invention, which is defined in the appended claims.

What is claimed is:

1. A method of communicating among a plurality of stations in a wireless environment in which a first signal having a first center frequency is present in a first frequency band, the plurality of stations communicating in a second frequency band having a second center frequency, the first center frequency and the second center frequency being mutually spaced apart by a separation frequency, the method comprising a transmitting method and a receiving method, the transmitting method including:
generating a transmit packet signal according to transmit data and a control signal;
modulating the transmit packet signal onto a carrier signal having the second center frequency to generate a modulated signal;
controlling a transmitting power level of the modulated signal; and
transmitting the modulated signal at the controlled transmitting power level; and the receiving method including:
receiving an incoming signal including the first signal and a second signal having the second center frequency, thereby obtaining a received signal;
generating a third signal by frequency down-conversion of the received signal so that the second signal is converted to a baseband signal;
sampling the third signal at a first sampling frequency, thereby converting the third signal to a discrete received signal; and
detecting a level of the first signal as interference in the discrete received signal.

2. The method of claim 1, wherein the first frequency band and the second frequency band are both used for dedicated short range communication.

3. The method of claim 1, wherein detecting an interference level further comprises:
resampling the discrete received signal at a second sampling frequency lower than the first sampling frequency; and
comparing levels of the discrete received signal before and after the resampling.

4. The method of claim 1, further comprising determining the transmitting power level from the interference level.

5. The method of claim 4, wherein determining the transmitting power level comprises reducing the transmitting power level when the detected level of the first signal exceeds a predetermined threshold level.

6. The method of claim 5, wherein determining the transmitting power level comprises reducing the transmitting power level by increasing amounts as the detected level of the first signal exceeds the predetermined threshold level by increasingly large amounts.

7. The method of claim 1, wherein the first sampling frequency is determined from the separation frequency.

8. The method of claim 7, wherein the first sampling frequency is at least twice the separation frequency.

9. The method of claim 1, wherein the first sampling frequency has at least twice a maximum value in a specified range of possible values of the separation frequency.

10. The method of claim 1, wherein the first sampling frequency has at least twice a minimum value in a specified range of possible values of the separation frequency.

11. The method of claim 1, further comprising searching for a plurality of first signals by sequentially altering the first sampling frequency, said first signal being one of the plurality of first signals.

12. The method of claim 1, wherein the control signal includes a reduced transmission flag, and generating the transmit packet signal includes setting the reduced transmission flag when the transmitting power level is controlled downward.

13. The method of claim 12, wherein the control signal is also present in the second signal, the control signal also includes a hopping flag, and when the reduced transmission flag is set in the control signal in the second signal, generating the transmit packet signal further includes:
generating the transmit packet signal from the second signal; and
setting the hopping flag in the transmit packet signal.

14. The method of claim 13, wherein the receiving method further includes determining the first sampling frequency from the hopping flag in the second signal.

15. A communication apparatus for communicating among a plurality of stations in a wireless environment in which a first signal having a first center frequency is present in a first frequency band, the plurality of stations communicating in a second frequency band having a second center frequency, the first center frequency and the second center frequency being mutually spaced apart by a separation frequency, the communication apparatus comprising:

a transmit packet generator for generating a transmit packet signal according to transmit data and a control signal;

a transmitting circuit for modulating the transmit packet signal onto a carrier signal having the second center frequency to generate a modulated signal and transmitting the modulated signal at a controlled transmitting power level;

a high-frequency receiving circuit for receiving an incoming signal including the first signal and a second signal having the second center frequency, thereby obtaining a received signal, and generating a third signal by frequency down-conversion of the received signal so that the second signal is converted to a baseband signal;

a sampling unit for determining a sampling frequency from the separation frequency, and sampling the third signal at the sampling frequency, thereby converting the third signal to a discrete received signal;

an interference level detector for detecting an interference level of the first signal in the discrete received signal; and a transmit level controller for controlling the transmitting power level of the modulated signal according to the detected interference level.

16. The communication apparatus of claim 15, wherein the transmit level controller lowers the transmitting power level according to the interference level.

17. The communication apparatus of claim 15, wherein the sampling unit searches for a plurality of first signals by sequentially altering the sampling frequency, said first signal being one of the plurality of first signals.

18. The communication apparatus of claim 15, wherein the control signal includes a reduced transmission flag, and the transmit packet generator sets the reduced transmission flag when the transmitting power level is controlled downward.

19. The communication apparatus of claim 15, wherein the control signal is also present in the second signal, the control signal also includes a hopping flag, and when the reduced transmission flag is set in the control signal in the second signal, the transmit packet generator generates the transmit packet signal from the second signal and sets the hopping flag in the transmit packet signal.

* * * * *